US006694338B1

(12) United States Patent
Lindsay

(10) Patent No.: US 6,694,338 B1
(45) Date of Patent: Feb. 17, 2004

(54) VIRTUAL AGGREGATE FIELDS

(75) Inventor: Walter Lindsay, San Jose, CA (US)

(73) Assignee: Contivo, Inc., Mountain View, CA (US)

( * ) Notice: Subject to any disclaimer, the term of this patent is extended or adjusted under 35 U.S.C. 154(b) by 84 days.

(21) Appl. No.: 09/650,219

(22) Filed: Aug. 29, 2000

(51) Int. Cl.[7] .............................................. G06F 17/30
(52) U.S. Cl. ......................... 707/203; 707/4; 707/100; 709/223; 715/503; 715/511
(58) Field of Search .......................... 707/3, 5, 6, 501, 707/100, 203, 4, 101, 201, 40, 202, 206; 709/218, 220, 223; 715/503, 511

(56) References Cited

U.S. PATENT DOCUMENTS

| | | | |
|---|---|---|---|
| 5,119,465 A | | 6/1992 | Jack et al. .................. 717/137 |
| 5,173,853 A | | 12/1992 | Kelly et al. ................. 715/530 |
| 5,272,628 A | * | 12/1993 | Koss .......................... 715/503 |
| 5,276,793 A | * | 1/1994 | Borgendale et al. ........ 715/513 |
| 5,367,619 A | * | 11/1994 | Dipaolo et al. ............. 715/506 |
| 5,369,761 A | | 11/1994 | Conley et al. ................. 707/2 |
| 5,428,776 A | * | 6/1995 | Rothfield ....................... 707/4 |
| 5,442,778 A | * | 8/1995 | Pedersen et al. ............... 707/5 |
| 5,584,024 A | * | 12/1996 | Shwartz ......................... 707/4 |
| 5,627,979 A | | 5/1997 | Chang et al. ............... 345/763 |
| 5,657,440 A | * | 8/1997 | Micka et al. ................... 707/1 |
| 5,724,573 A | | 3/1998 | Agrawal et al. ............... 707/6 |
| 5,946,688 A | * | 8/1999 | Roberts ....................... 707/10 |
| 5,960,435 A | * | 9/1999 | Rathmann et al. .......... 707/101 |
| 6,009,429 A | | 12/1999 | Greer et al. ................... 707/10 |
| 6,014,680 A | | 1/2000 | Sato et al. ................... 715/513 |
| 6,067,552 A | | 5/2000 | Yu .............................. 707/501 |
| 6,085,196 A | | 7/2000 | Motoyama et al. ......... 707/102 |
| 6,128,627 A | * | 10/2000 | Mattis et al. ............... 707/202 |
| 6,202,072 B1 | | 3/2001 | Kuwahara ................... 715/513 |
| 6,209,003 B1 | * | 3/2001 | Mattis et al. ............... 707/206 |
| 6,282,544 B1 | * | 8/2001 | Tse et al. .................... 707/101 |
| 6,311,173 B1 | | 10/2001 | Levin et al. ................... 706/21 |
| 6,327,594 B1 | * | 12/2001 | Van Huben et al. ........ 707/200 |
| 6,434,568 B1 | * | 8/2002 | Bowman-Amuah ..... 707/103 R |
| 6,453,319 B1 | * | 9/2002 | Mattis et al. ............... 707/100 |
| 6,484,177 B1 | * | 11/2002 | Van Huben et al. .......... 707/10 |
| 6,499,041 B1 | | 12/2002 | Breslau et al. .............. 715/505 |
| 6,529,909 B1 | * | 3/2003 | Bowman-Amuah .......... 707/10 |
| 6,546,381 B1 | * | 4/2003 | Subramanian et al. ......... 707/2 |
| 2002/0010714 A1 | | 1/2002 | Hetherington .............. 715/505 |

OTHER PUBLICATIONS

Kotsakis et al., "XML Schema Directory: A Data Structure for XML Data Processing," Proceedings of the First International Conference on Web Information Systems Engineering, vol. 1, pp. 62–66, Jun. 2000.

* cited by examiner

Primary Examiner—Shahid Al Alam
(74) Attorney, Agent, or Firm—Blakley, Sokoloff, Taylor & Zafman LLP

(57) ABSTRACT

A method comprising defining one or more aggregate virtual fields for a first document using meta-data associated with the first document is disclosed.

18 Claims, 7 Drawing Sheets

GroupI
  GroupA
  GroupB
    Group1
      - Field1.1
      - Field1.2
      - Field1.3
    Group2
      - Field2.1
      - Field2.2
    Group3
      - Field3.1
      - Field3.2
  GroupC

FIG. 1

GroupI
    GroupA
    GroupB
- F_Meaning1 (Description = Meaning One";
  ParticipatingFields = {Group1/Field1.3,
  Group3/Field3.2};
  MapTo = {
      Group1/Field1.3 =
      substring (F_Meaning1,1,9)
      Group3/Field3.2 =
      substring (F_Meaning1,10,13)
  }
  MapFrom = {
      F_Meaning1 = concat (Group1/Field1.3,
      Group3/Field3.2)
  }
  )

Group1
- Field1.1
- Field1.2
- Field1.3

Group2
- Field2.1
- Field2.2

Group3
- Field3.1
- Field3.2

GroupC

FIG. 2

```
AggregateField {
    Name = "F_Meaning1"
    ParentGroup = GroupB
    Description = "Meaning One"
    ParticipatingFields = {Group1/Field1.3,
    Group3/Field3.2}
    MapTo = {
        Group1/Field1.3 = substring(F_Meaning1,1,9)
        Group3/Field3.2 = substring(F_Meaning1,10,13)
    }
    MapFrom = }
        F_Meaning1 = concat(Group1/Field1.3,
        Group3/Field3.2)
    }
}
```

FIG. 3

VIRTUAL AGGREGATE FIELDS

FIELD OF INVENTION

The invention is related to the field of representation and translation of electronic documents.

BACKGROUND OF THE INVENTION

Some documents have fields that must be combined or massaged to produce data that matches a desired "meaning". For example, in a document, the following structure may be present in Document1:

Store_Identifier (group)
  DUNS_Number (9-digit field)
  Store_Number (4-digit field)
And in Document2:
Location (11-digit field)

Where the Location is the DUNS_Number with the Store_Number concatenated to it. In this case, a "meaning" is part of multiple fields in Document1.

Conventional solutions to mapping require users to write customized code to handle such cases. For example, suppose Vendor1 has a mapping tool that Customer1 uses. Customer1 is mapping Document1 to Document2. Customer1 writes code like:

Target.Location=concat(Source.Store_Identifier.DUNS_Number, Source.Store_Identifier.Store_Number)

Locations in a document can have more than one meaning. This means that mapping is hard to automate. Instead, the mappings must be manually done and require customized code, which does not allow reuse of mapping knowledge and rules.

Conventional solutions have several disadvantages. First, both mapping and the mapping rules are one-off. That is, each time a user wants to define how to perform a document translation, similar code must be written and tested. This increases the time needed to define how to translate from the source to the target document.

Furthermore, both mapping and the mapping rules depend on user-written code. This makes it hard to automatically validate the integrity of the mapping. It also sets a minimum bar for the skill level of anyone trying to define a mapping, as they must then know all the document locations that might hold a particular meaning, and must be skillful enough to write the code to handle the case. This imposes a maintenance burden, as fixing a problem in a mapping requires altering code.

The mapping and the mapping rules are translation-language dependent. The code that must be written and tested depends on the underlying translation engine that will translate the documents. Thus, mapping rules will be translation-engine dependent, and that a translation defined for one translation engine will likely need adjusting to make the mapping work on a different translation engine. Moving a transform from one translation engine to another is difficult.

The source and target mappings must be significantly different. The code for handling the case described above will differ whether the document is the source or the target document. If one has mapped from A to B, mapping from B to A requires major rework, as the code for the mapping would have to be re-written using different logic.

Conventional mapping tools previously use superficial similarities in field names or document structure as the basis for automapping. They can not automap to virtual structures, forcing users to write code.

SUMMARY OF THE INVENTION

A method comprising defining one or more aggregate virtual fields for a first document using meta-data associated with the first document is disclosed.

BRIEF DESCRIPTION OF THE DRAWINGS

The present invention is illustrated by way of example and not limitation in the figures of the accompanying drawings, in which like references indicate similar elements, and in which:

FIG. 1 illustrates one embodiment of a data structure for part of a document.

FIG. 2 illustrates another embodiment of a data structure for the same document as FIG. 1.

FIG. 3 illustrates one embodiment of a data structure including the information needed to create the virtual aggregate field of FIG. 2.

DETAILED DESCRIPTION

Figure 4:
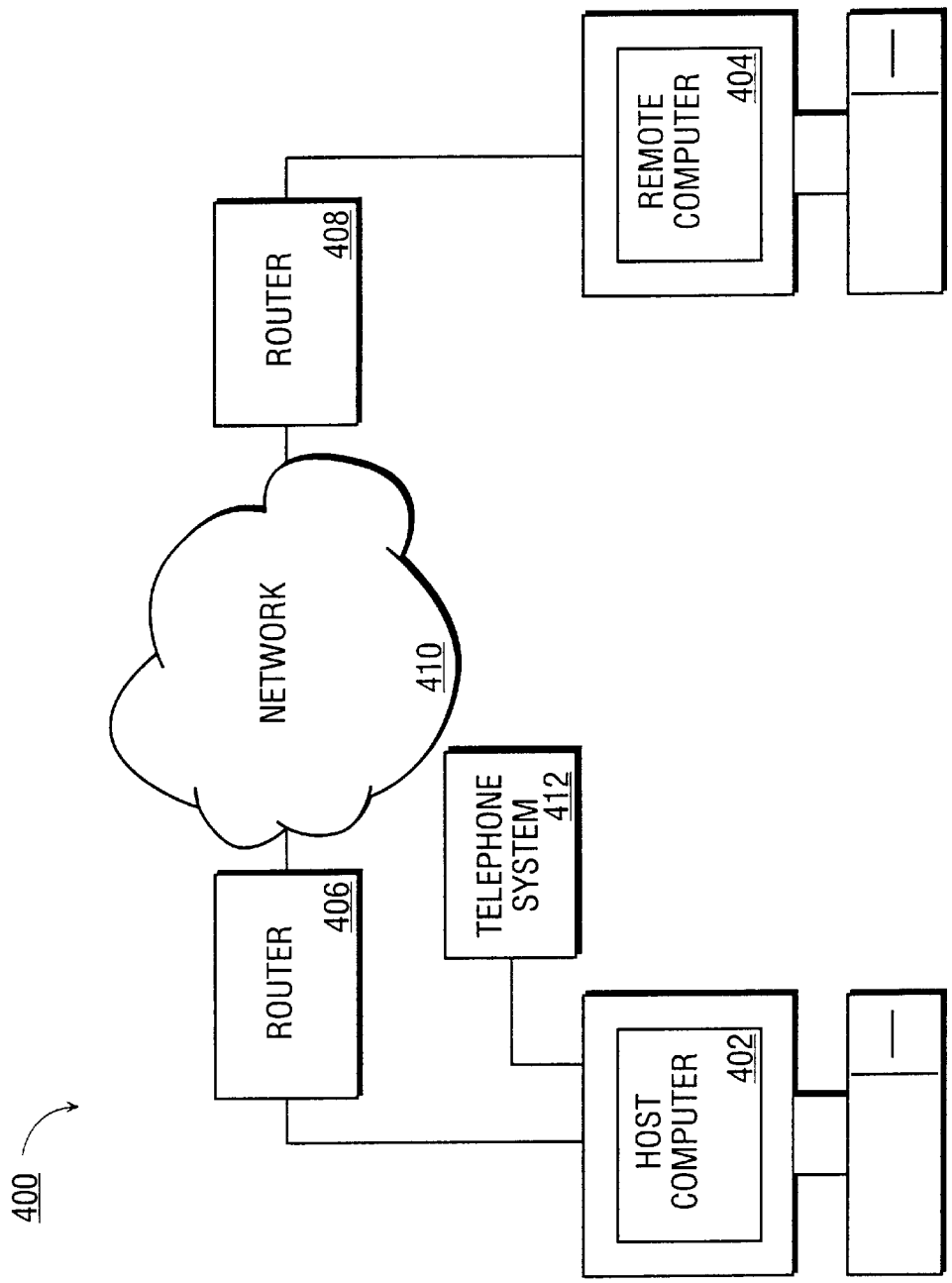
FIG. 4 is an example of a network that uses aggregate virtual fields to translate documents.

A transform to perform mappings can be automatically generated using virtual aggregate fields. The virtual aggregate fields can be used to create a named field in the document, and associate it with a set of fields with a "map-to" and/or a "map-from" rule. All mapping and mapping rule operations can then be applied on the new field. The transform to perform the mappings can then be automatically generated, as discussed below.

FIG. 1 depicts a data structure for part of a document. GroupI has other groups under it, GroupA, GroupB and GroupC. GroupB has other groups under it, including Group1, which has field Field1.3 in it. The full path through this document, from the top as shown down to Field1.3, is described as:

GroupI/GroupB/Group1/Field1.3

Field1.3 and Field3.2 hold information that together represent a "meaning" of the document. It is important to realize that in many concrete documents a structure like GroupB can repeat many times. FIG. 1 is an example of one embodiment of meta-data. In a concrete document, GroupB can appear multiple times. This is a particular instance of GroupB. Each instance of GroupB can have different data in its fields.

Enabling and Disabling a Virtual Aggregate Field

FIG. 2 depicts a data structure for the same document as FIG. 1, except that field F_Meaning1 defined. That is, if a mapping accesses field F_Meaning1 in a source document, the transform will automatically use the MapFrom code. If a mapping accesses field F_Meaning1 in a target document, the transform will automatically use the MapTo code.

F_Meaning1 is an enabled virtual aggregate field. That is, it appears in the document. There are events, such as the user in the GUI, that trigger the virtual aggregate field to be enabled—inserted into the document. Similarly, a virtual aggregate field can be disabled and disappear from the document.

Source Data for Defining Virtual Aggregate Fields

The descriptions of virtual aggregate fields can be stored in an external data source. FIG. 3 illustrates a data structure including the information needed to create the virtual aggregate field of FIG. 2. The information needed to generate a virtual group is:

Name—the name of the new field.

ParentGroup—the location of the new field.

Description—a textual description of the general meaning of the new field.

ParticipatingFields—the fields that hold the source data of the new field.

MapTo—code that, given the value of the virtual field, populates the ParticipatingFields.

MapFrom—code that, given the ParticipatingFields, produces the value of the virtual aggregate field.

Using Virtual Groups in Source Documents to Automatically Generate a Transform Users can apply mapping rules to meta-data to map from a field under a virtual aggregate field in the source document to the relevant location(s) in the target document. A virtual aggregate field in a source document can be treated just like any other field. Whatever operations—move, or any other mapping rule that might be applied to other fields—apply to such fields.

A transform is the code used by a translation engine to convert one concrete document to another. A transform is generated by applying mapping rules to the meta-data of the source and target documents. After the mapping rules and the meta-data, including virtual aggregate fields, are defined, a transform can be automatically generated, which performs the following processing on fields in a virtual aggregate field defined for a concrete source document:

Apply the MapTo function, and return its value.

Note that simple extension to support default values, etc. are within the scope of the invention. For example, a default value for a participating field in a virtual aggregate field could be added to the information in FIG. 3. Looping functionality could also be supported to create a virtual aggregate field that combines the information of multiple structures into a single value.

Using Virtual Groups in Target Documents to Automatically Generate a Transform Users can map from location(s) in the source document to a virtual aggregate field in the target document. A virtual aggregate field in a target document can be treated just like any other field. Whatever operations—move, or any other manipulation rule that might be applied to other fields—apply to virtual aggregate fields.

After a transformation is defined, a transform can be automatically generated, which will do this processing on virtual aggregate fields defined for a concrete target document:

Apply the MapFrom function on the data mapped to the virtual aggregate field, in order to populate the participating fields.

Note that simple extension to support default values, etc. are within the scope of the invention. For example, a default value for a participating field of a virtual aggregate field could be added to the information of FIG. 3, such that the participating field is conditionally populated. Users can write the code of the MapTo and MapFrom functions.

Hardware Overview

According to the present invention, a host computer system transmits and receives data over a computer network or standard telephone line. According to one embodiment, the steps of accessing, downloading, and manipulating the data, as well as other aspects of the present invention are implemented by a central processing unit (CPU) in the host computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the host computer from a storage device, or from one or more other computer systems over a network connection. For example, a server computer may transmit a sequence of instructions to the host computer in response to a message transmitted to the server over a network by the host. As the host receives the instructions over the network connection, it stores the instructions in memory. The host may store the instructions for later execution or execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the host computer.

FIG. 4 illustrates a system 400 in which a host computer 402 is connected to a remote computer 404 through a network 410. The network interface between host computer 402 and remote 404 may also include one or more routers, such as routers 406 and 408, which serve to buffer and route the data transmitted between the host and client computers. Network 410 may be the Internet, a Wide Area Network (WAN), a Local Area Network (LAN), or any combination thereof. The remote computer 404 may be a World-Wide Web (WWW) server that stores data in the form of 'web pages' and transmits these pages as Hypertext Markup Language (HTML) files over the Internet network 410 to host computer 402. To access these files, host computer 402 runs a 'web browser', which is simply an application program for accessing and providing links to web pages available on various Internet sites. Host computer 402 is also configured to communicate to telephone system 412 through a telephone interface, typically a modem.

Figure 5:
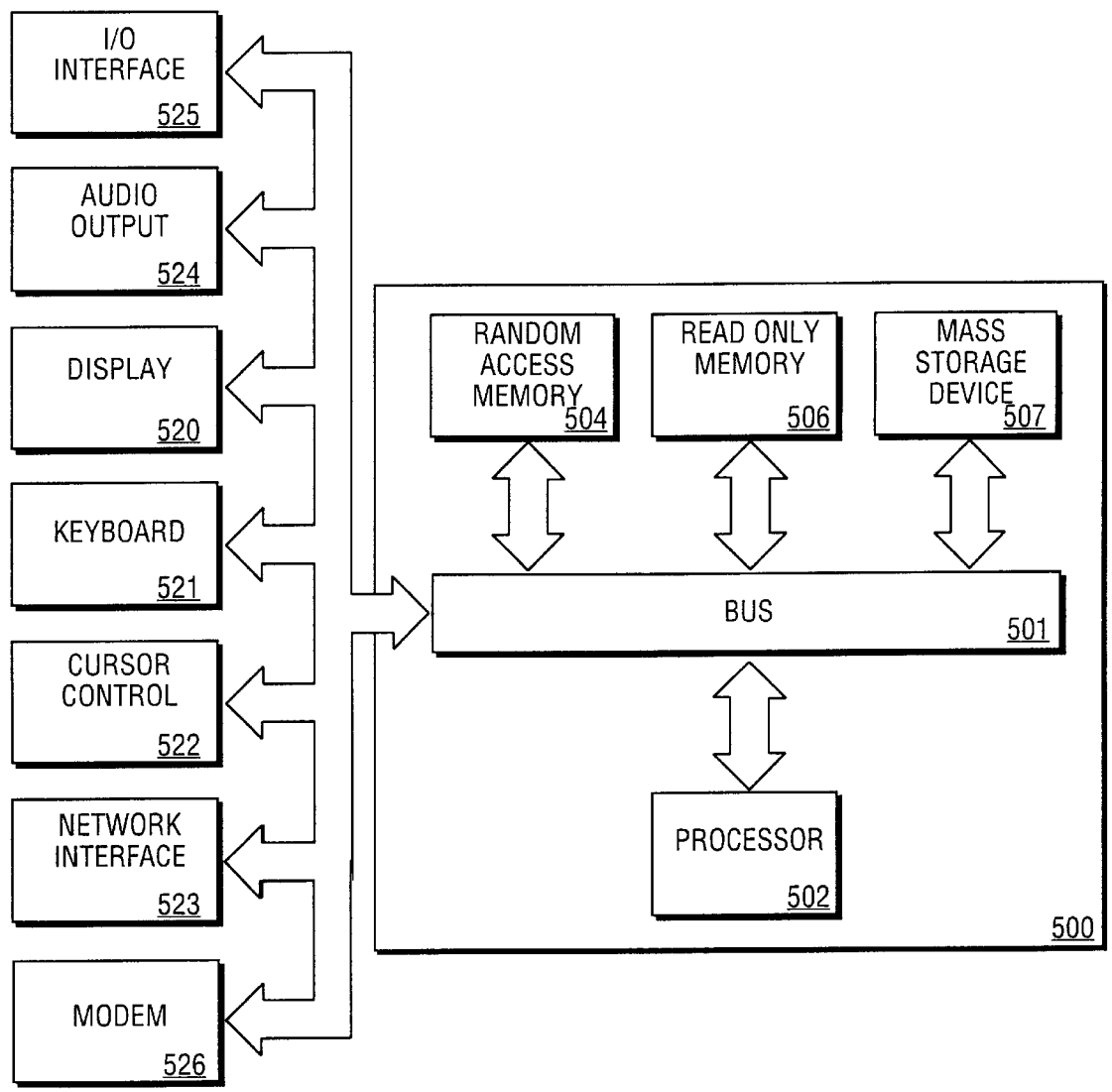
FIG. 5 is an example of a computer system that uses aggregate virtual fields to translate documents.

FIG. 5 is a block diagram of a representative networked computer, such as host computer 402 illustrated in FIG. 4. The computer system 500 includes a processor 502 coupled through a bus 501 to a random access memory (RAM) 504, a read only memory (ROM) 506, and a mass storage device 507. Mass storage device 507 could be a disk or tape drive for storing data and instructions. A display device 520 for providing visual output is also coupled to processor 502 through bus 501. Keyboard 521 is coupled to bus 501 for communicating information and command selections to processor 502. Another type of user input device is cursor control unit 522, which may be a device such as a mouse or trackball, for communicating direction commands that control cursor movement on display 520. Also coupled to processor 502 through bus 501 is an audio output port 524 for connection to speakers that output audio signals produced by computer 500.

Further coupled to processor 502 through bus 501 is an input/output (I/O) interface 525, and a network interface device 523 for providing a physical and logical connection between computer system 500 and a network. Network interface device 523 is used by various communication applications running on computer 500 for communicating over a network medium and may represent devices such as an ethernet card, ISDN card, or similar devices.

Modem 526 interfaces computer system 500 to a telephone line and translates digital data produced by the computer into analog signals that can be transmitted over standard telephone lines, such as by telephone system 412 in FIG. 4. In an embodiment of the present invention, modem 526 provides a hardwired interface to a telephone wall jack, however modem 526 could also represent a wireless modem for communication over cellular telephone networks. It should be noted that the architecture of FIG. 4 is provided only for purposes of illustration, and that a host computer used in conjunction with the present invention is not limited to the specific architecture shown.

Figure 6:
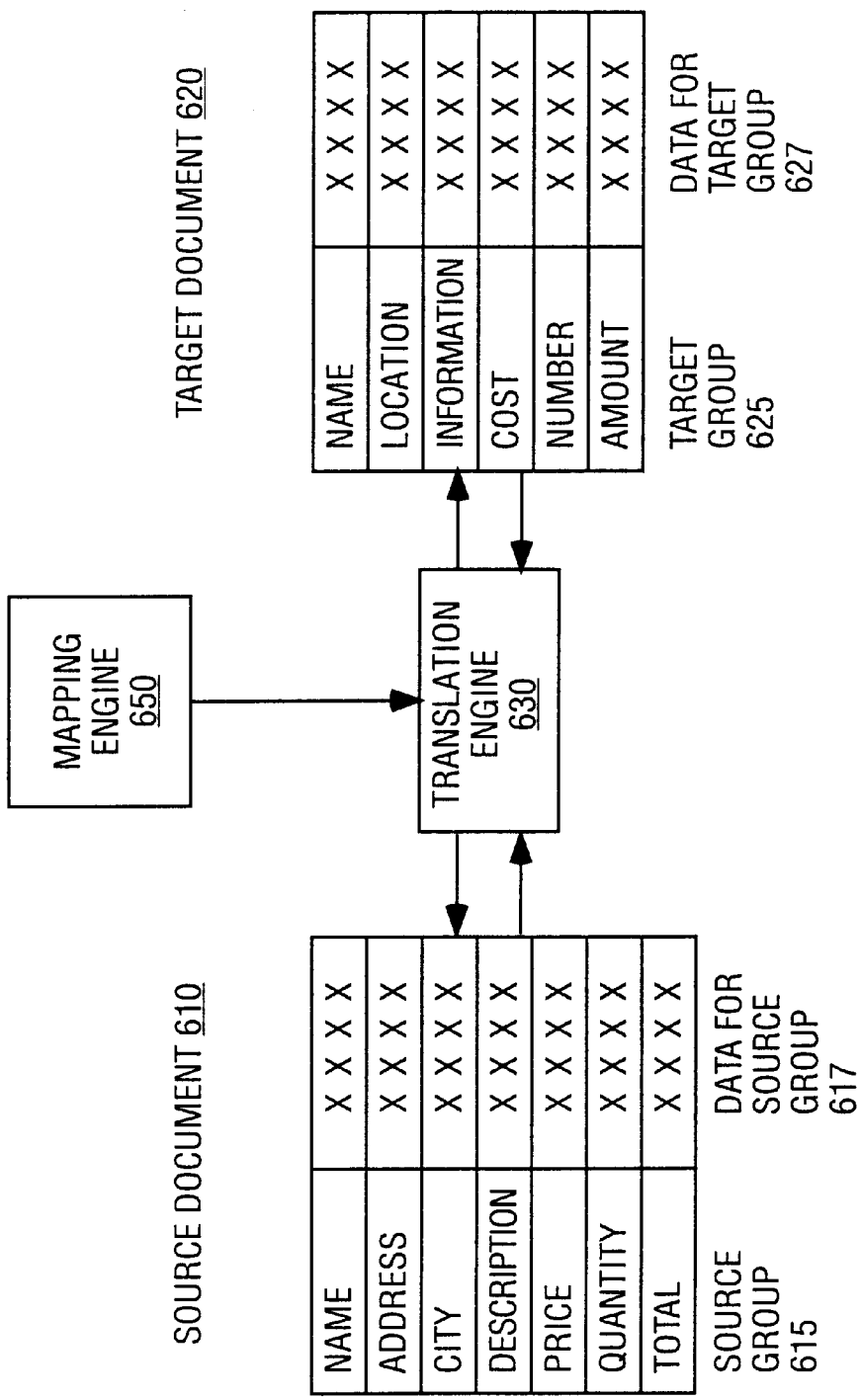
FIG. 6 is an example of a translation system that uses aggregate virtual fields to translate documents.

FIG. 6 shows an example of the groups and fields of two different documents, a source document format 610 and a target document format 620. In this embodiment, the document is a purchase order. However, the document may convey any information that one person or business wants to send to another person or business. The source group 615 includes the source fields of name, address, city, description, price, quantity, and total. The target group 625 includes the fields name, location, information, cost, number, and amount. Although the formats of the fields in the source and target groups are structurally different, they have similarities and common abstractions such as name, amount, and place to ship the goods. Thus, the names of the fields in groups 615 and 625 may be different, such as "price" and "cost," for example, but the data 617 and 627 contained in these fields is the same.

A virtual field that corresponds to a field in the source and target groups 615 and 625 can be used to capture these common abstractions using meta-data. For example, meta-data associated with the source document can be used by the mapping engine to define one or more aggregate virtual fields. The meta-data used to define the aggregate virtual fields can be obtained from a data structure such as the data structure of FIG. 3. After the aggregate virtual fields are defined, the mapping engine can apply mapping rules to the meta-data associated with the source group, including the aggregate virtual fields, to automatically generate a transform. The transform is then provided to the translation engine, which uses the transform to convert the source document into the target document.

A mapping engine 650 creates a translation map, as shown in FIG. 6. The translation map is used by a translation engine 630 to convert, or translate a message from a source format to a target format. The translation map is a meta-data level description of the fields in the source document that will be used to populate a field in the target document.

Figure 7:
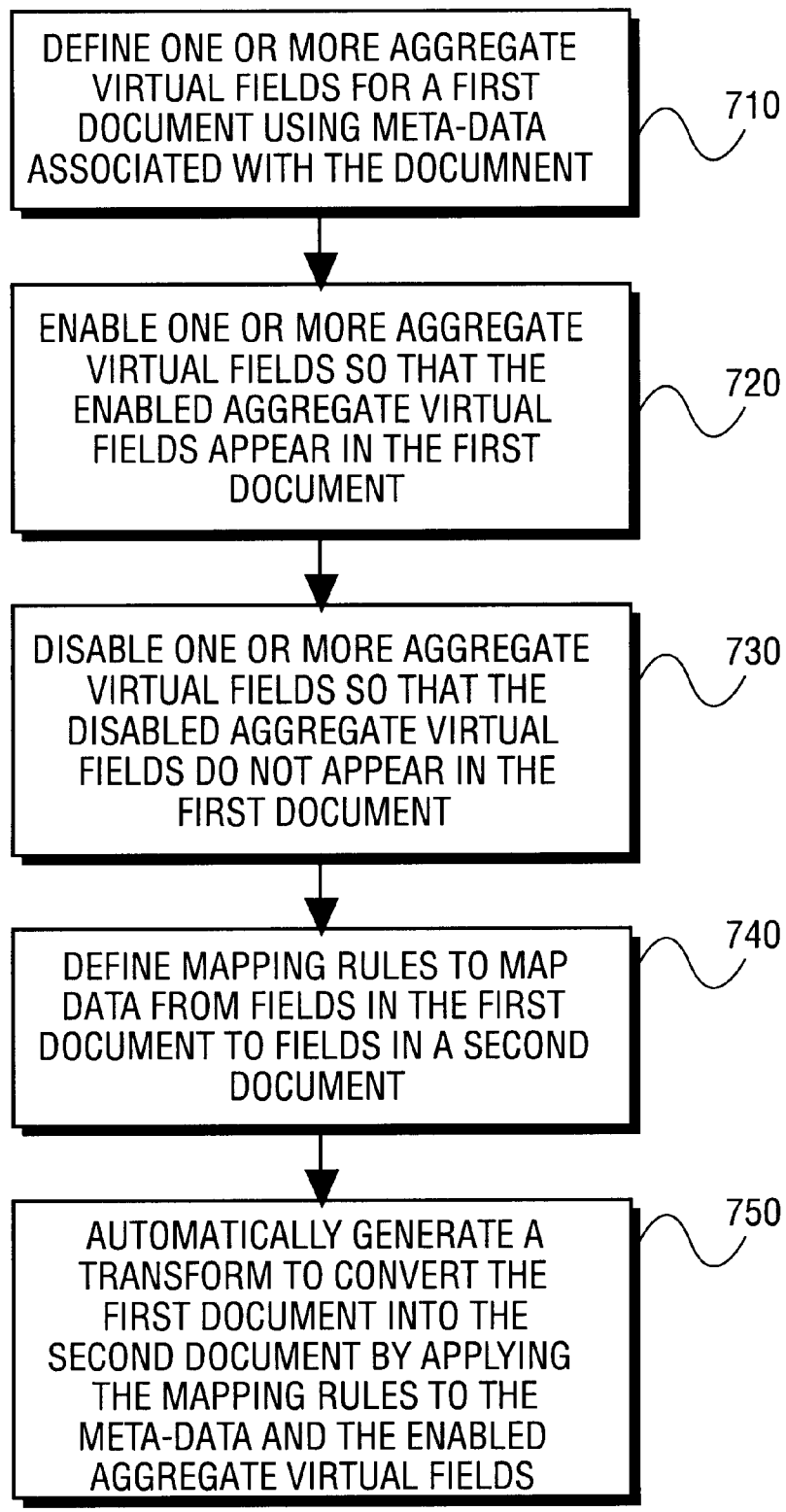
FIG. 7 is an embodiment of a method for automatically generating a transform using aggregate virtual fields.

FIG. 7 shows an embodiment of a method for automatically generating a transform using aggregate virtual fields. One or more aggregate virtual fields for a first document are defined, step 710. The aggregate virtual fields are defined using meta-data contained in the data structure of FIG. 3. One or more of these aggregate virtual fields are enabled, so that the enabled aggregate virtual fields appear in the first document, step 720. One or more of the aggregate virtual fields may be disabled, so that the disabled aggregate virtual fields do not appear in the first document, step 720. Mapping rules to map data from fields in the first document to fields in a second document are defined, step 740. Then, a transform to convert the first document into the second document is automatically generated by applying the mapping rules to the meta-data, including the enabled aggregate virtual fields, of the first and second documents.

Virtual aggregate fields thus provide several advantages. First, the virtual aggregate fields allow code to automap between source and target documents. The automapping code enables aggregate virtual fields as needed—if it discovers that a field under a aggregate virtual field that could potentially be enabled is required by the automapping mechanism, it enables the aggregate virtual field.

Second, merely doing the mapping tends to be sufficient if a aggregate virtual field is involved. Once the virtual aggregate field is defined, the user does not need to write code to identify when the data of the fields of a aggregate virtual field have a particular meaning, or write code to convert between the aggregate virtual field and its constituent fields.

Third, the ability to write code is not compromised. This new technique can co-exist with the older way of doing things. Fourth, transformation instructions can be successfully generated for the translation engines.

Fifth, mapping from document A to B is much closer to mapping from B to A than without this invention. Thus, the mapping from B to A has been made closer to the transposition of the mapping from A to B. Mapping one direction then provides most of the information needed to map the other direction. If users had to write code to map from A to B, such a transposition would be far more work. With this invention, transposing a mapping is far less work.

Sixth, mapping to or from fields under a aggregate virtual field is translation-engine independent (assuming the code of the MapTo and MapFrom functions can support the target translation engines). We merely generate the code appropriate for that translation engine when writing out the transform in the way that translation engine requires.

Seventh, without needing to perform complicated analyses of user-written code, we can validate mappings to and from fields under aggregate virtual fields, as most cases do not require the user to write code. Because fewer mappings require the user to write code, mapping difference checking is easier. This way, once the MapTo and MapFrom functions have been validated, mapping difference checking is simplified.

Eighth, a non-programmer can do most of the work of mapping. Ninth, maps are more translation-engine independent, as less overall code is needed. Tenth, creating a map is faster, as automapping has a better hit rate. Eleventh, maps have fewer bugs, as users don't need to write code. Thus, debugging a mapping is faster. Twelfth, time to market is faster for users. Thirteenth, this mechanism works with virtual fields and groups.

Fourteenth, nesting of virtual groups works. That is, the meaning of a structure in a concrete document can depend on several qualifier fields as discussed above.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A method for transforming a first document in a first format to a second document in a second format, the method comprising:

selectively enabling one or more virtual aggregate fields in meta-data for at least one of the first and second documents, each virtual aggregate field being a virtual field which when enabled appears in the meta-data only, and which has an abstract meaning which links one or more fields of the first document with one or more fields of the second document;

defining mapping rules to map data from fields in the first document to fields in the second document; and automatically generating a transform to convert the first document into the second document by applying the mapping miles to the meta-data and the enabled virtual aggregate fields.

2. The method of claim 1, further comprising predefining the virtual aggregate fields including defining a map-from-code that specifies how to generate the one or more fields in the second document from the one or more fields in the first document, and a map-to-code that specifies how to generate the one or more fields in the first document from the one or more fields in the second document.

3. The method of claim 1, wherein predefining the virtual aggregate fields comprises building a data structure for each virtual aggregate field, the data structure comprising a name data element which contains a name for the virtual aggregate field, a parent group data element that specifies a parent group for the virtual aggregate field, a participating fields data element that specifies the fields being linked, a map-to-data element that contains the map-to-code, and a map-from-data element that contains the map-from-code.

4. The method of claim 3, wherein selectively enabling the virtual aggregate fields comprises selectively enabling the virtual aggregate fields in the meta-data for the first document, in which case the transform executes the map-from-code.

5. The method of claim 3, wherein selectively enabling the virtual aggregate field comprises enabling the virtual aggregate fields in the second document, in which case the transform executes the map-to-code.

6. A method for transforming a first document in a first format to a second document in a second format, the method comprising:

identifying one or more fields in the first document that map to one or more fields in the second document based on a meaning of the fields;

defining a virtual aggregate field based on the identified fields;

defining a map-from-code that specifies how to generate the one or more fields in the second document from the one or more fields in the first document; and defining a map-to-code that specifies how to generate the one or more fields in the first document from the one or more fields in the second document.

7. The method of claim 6, further comprising linking the virtual aggregate field to the map-from-code and the map-to-code through a data element in a data structure.

8. The method of claim 7, further comprising selectively enabling the virtual aggregate field in meta-data for the first or the second documents.

9. The method of claim 8, further comprising defining mapping rules to map data from fields in the first document to fields in the second document.

10. The method of claim 9, further comprising automatically generating a transform to convert the first document into the second document by applying the mapping rules to the meta-data and the enabled virtual aggregate field.

11. The method of claim 10, wherein selectively enabling the virtual aggregate field comprises enabling the virtual aggregate field in the meta-data for the first document, in which case, the transform executes the map-from code.

12. The method of claim 9, wherein selectively enabling the virtual aggregate field comprises enabling the virtual aggregate field in the, second document, in which case, the transform executed the map-to-code.

13. A computer readable medium having stored therein a sequence of instructions which when executed by a computer, cause the computer to perform a method for transforming a first document in a first format to a second document in a second format the method comprising:

selectively enabling one or more virtual aggregate fields in meta-data for at least one of the first and second documents, each virtual aggregate field being a virtual field which when enabled appears in the meta-data only, and which has an abstract meaning which links one or more fields of the first document with one or more fields of the second document;

defining mapping rules to map data from fields in the first document to fields in the second document; and automatically generating a transform to convert the first document into the second document by applying the mapping rules to the meta-data and the enabled virtual aggregate fields.

14. A computer readable medium having stored thereon a sequence of instructions which when executed by a computer, cause the computer to perform a method for transforming a first document in a first format to a second document in a second format, the method comprising:

identifying one or more fields in the first document that map to one or more fields in the second document based on a meaning of the fields;

defining a virtual aggregate field based on the identified fields;

defining a map-from-code that specifies how to generate the one or more fields in the second document from the one or more fields in the first document; and defining a map-to-code that specifies how to generate the one or more fields in the first document from the one or more fields in the second document.

15. A system comprising:

a processor;

a memory coupled to a processor, the memory storing instructions which when executed by the processor, cause the processor to perform a method for transforming a first document in a first format to a second document in a second format, the method comprising:

selectively enabling one or more virtual aggregate fields in meta-data for at least one of the first and second documents, each virtual aggregate field being a virtual field which when enabled appears in the meta-data only, and which has an abstract meaning which links one or more field of the first document with one or more fields of the second document;

defining mapping rules to map data from fields in the first document to fields in the second document; and automatically generating a transform to convert the first document into the second document by applying the mapping rules to the meta-data and the enabled virtual aggregate fields.

16. A system comprising:

a processor;

a memory coupled to a processor, the memory storing instructions which when executed by the processor, cause the processor to perform a method for transforming a first document in a first format to a second document in a second format, the method comprising:
identifying one or more fields in the first document that map to one or more fields in the second document based on a meaning of the fields;
defining a virtual aggregate field based on the identified fields;
defining at map-from-code that specifies how to generate the one or more fields in the second document from the one or more fields in the first document; and
defining a map-to-code that specifies how to generate the one or more fields in the first document from the one or more fields in the second document.

17. A system for transforming a first document in the first format to a second document in a second format, the system comprising:
means for selectively enabling one or more virtual aggregate fields in meta-data for at least one of the first and second documents each virtual aggregate field begin a virtual field which when enable appears in the meta-data only, and which has an abstract meaning which links one or more fields of the first document with one or more fields of the second document;
means for defining mapping rules to map data from fields in the first document to fields in the second document; and
means for automatically generating a transform to convert the first document into the second document by applying the mapping rules to the meta-data and the enabled virtual aggregate fields.

18. A system for transforming a first document in the first format to a second document in a second format, the system comprising:
means for identifying one or more fields in the first document that map to one or more fields in the second document based on a meaning of the fields;
means for defining a virtual aggregate field based on the identified fields;
means for defining a map-from-code that specifies how to generate the one or more fields in the second document from the one or more fields in the first document; and
means for defining a map-to-code that specifies how to generate the one or more fields in the first document from the one or more fields in the second document.

* * * * *